United States Patent
Jaakola

(10) Patent No.: US 10,877,820 B1
(45) Date of Patent: Dec. 29, 2020

(54) APPLICATION EVENT DELIVERY

(71) Applicant: Arm Limited, Cambridge (GB)

(72) Inventor: Jarkko Teuvo Tapio Jaakola, Oulu (FI)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 16/587,127

(22) Filed: Sep. 30, 2019

(51) Int. Cl.
*G06F 3/00* (2006.01)
*G06F 9/54* (2006.01)
*G06F 11/30* (2006.01)
*G06F 9/50* (2006.01)

(52) U.S. Cl.
CPC ............ *G06F 9/542* (2013.01); *G06F 9/5011* (2013.01); *G06F 9/544* (2013.01); *G06F 11/3006* (2013.01); *G06F 11/3075* (2013.01)

(58) Field of Classification Search
CPC ....................................................... G06F 9/54
USPC ......................................................... 719/310
See application file for complete search history.

(56) References Cited

U.S. PATENT DOCUMENTS

| 4,780,855 | A | * | 10/1988 | Iida | ...................... | G11C 16/102 |
|---|---|---|---|---|---|---|
| | | | | | | 365/185.09 |
| 2005/0268065 | A1 | * | 12/2005 | Awada | .................. | G06F 9/5077 |
| | | | | | | 711/173 |
| 2015/0370627 | A1 | * | 12/2015 | Nakajima | ........... | G06F 11/3409 |
| | | | | | | 714/2 |
| 2020/0104244 | A1 | * | 4/2020 | Christen | ............. | G06F 11/3692 |

OTHER PUBLICATIONS

Xingfu Wu, Design and Implementation of Prophesy Automatic Instrumentation and Data Entry System. (Year: 2000).*

* cited by examiner

*Primary Examiner* — Lechi Truong
(74) *Attorney, Agent, or Firm* — Nixon & Vanderhye P.C.

(57) ABSTRACT

A computer implemented method comprising: determining, at a remote device, a first occurrence of an event associated with a resource; storing, at a memory of the remote device, a first resource instance of the resource comprising a first resource instance identifier and first event data associated with the first occurrence of the event; determining, at a remote device, a second occurrence of an event associated with the resource; storing, at the memory of the remote device, a second different resource instance of the resource comprising a second resource instance identifier and second event data associated with the second occurrence of the event; and transmitting, from the remote device to an external entity, at least one of the first resource instance and the second different resource instance.

14 Claims, 8 Drawing Sheets

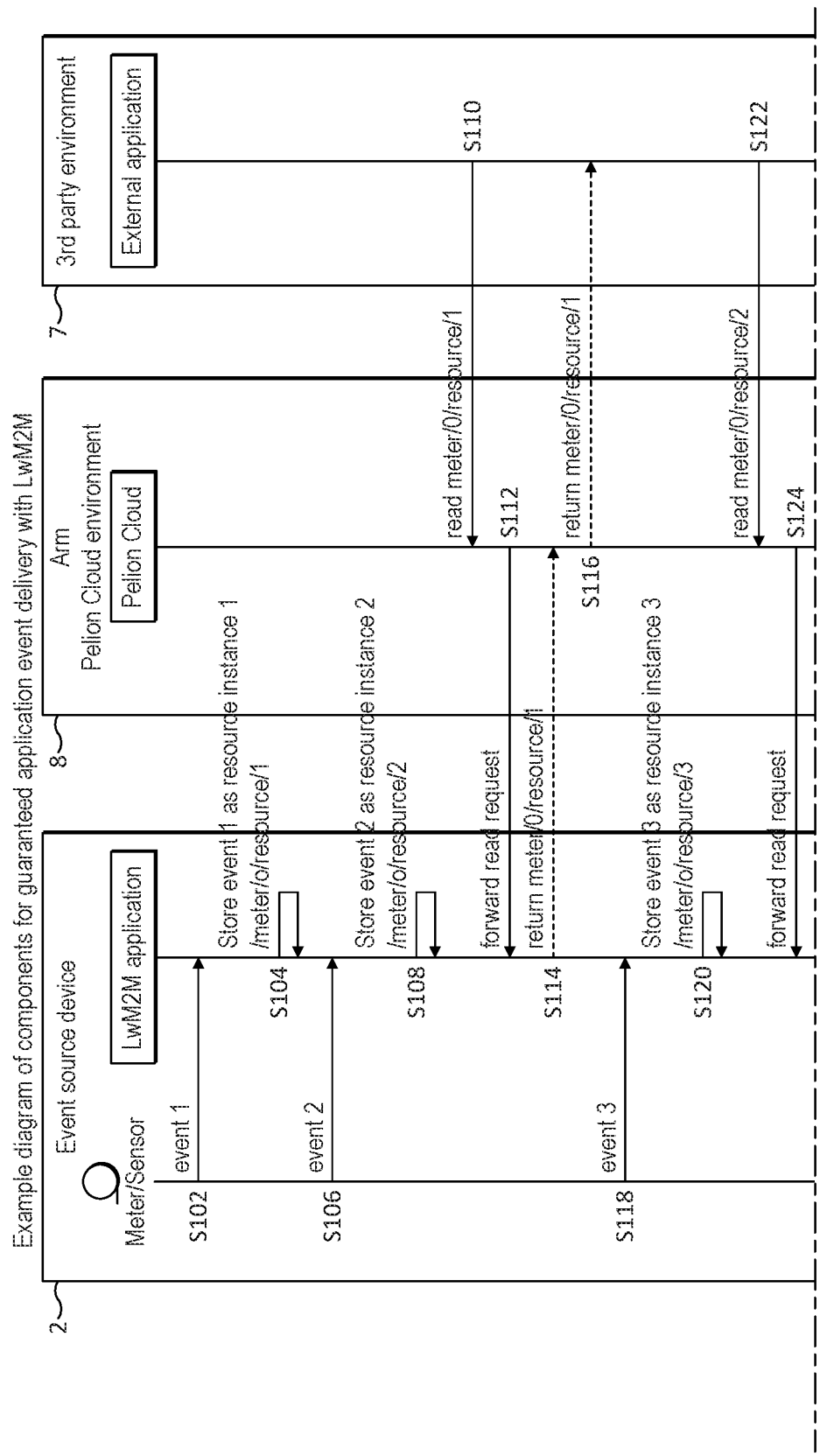

APPLICATION EVENT DELIVERY

The present techniques relate to application event delivery. More particularly, the techniques relate to guaranteed application event delivery using Lightweight Machine to Machine (LwM2M) protocol.

Cloud computing services are becoming more common. More and more devices are being connected to the cloud, for example as part of the "Internet of Things" (IoT). For example, relatively small devices such as temperature sensors, healthcare monitors and electronic door locks can be connected to the cloud so that they can be accessed and controlled using remote systems. For example, the door may be remotely opened from a remote platform, or data from a temperature sensor or healthcare monitor may be aggregated at a remote location and accessed from another device. Hence, there is an increasing amount of data being collected by cloud platforms and their providers.

Data is generally transmitted between devices and other entities using Machine to Machine (M2M) communication techniques. The LwM2M is a protocol for M2M or IoT device management, and the present applicant has recognised the need for improved (M2M) communication techniques.

According to a first aspect of the present technique, there is provided a computer implemented method comprising determining, at a remote device, a first occurrence of an event associated with a resource; storing, at a memory of the remote device, a first resource instance of the resource comprising a first resource instance identifier and first event data associated with the first occurrence of the event; determining, at a remote device, a second occurrence of an event associated with the resource; storing, at the memory of the remote device, a second different resource instance of the resource comprising a second resource instance identifier and second event data associated with the second occurrence of the event; and transmitting, from the remote device to an external entity, at least one of the first resource instance and the second different resource instance.

According to a second aspect of the present technique, there is provided a system comprising a remote device configured to: determine a first occurrence of an event associated with a resource; store, at a memory of the remote device, a first resource instance of the resource comprising a first resource instance identifier and first event data associated with the first occurrence of the event; determine a second occurrence of an event associated with the resource; store, at the memory of the remote device, a second different resource instance of the resource comprising a second resource instance identifier and second event data associated with the second occurrence of the event; and transmit, to an external entity, at least one of the first resource instance and the second different resource instance.

According to a third aspect of the present technique, there is provided a computer implemented method comprising detecting, at a remote device, a plurality of occurrences of an event associated with a resource, the events being temporally monotonic; storing, at a memory of the remote device, for each of the plurality of occurrences of the event, a resource instance of the resource comprising a resource instance identifier and event data associated with the occurrence of the event; receiving, from an external entity, a read request for one of the plurality of resource instances, the read request comprising the resource instance identifier for the one of the plurality of resource instances; and modifying one or more of the plurality of resource instances which are temporally prior to the one of the plurality of resource instances for which the read request was received.

According to a fourth aspect of the present technique, there is provided a system comprising a remote device configured to: detect a plurality of occurrences of an event associated with a resource; store, at a memory of the remote device, for each of the plurality of occurrences of the event, a resource instance of the resource comprising a resource instance identifier and event data associated with the occurrence of the event; receive, from an external entity, a read request for one of the plurality of resource instances, the read request comprising the resource instance identifier for the one of the plurality of resource instances; and modify one or more of the plurality of resource instances which are temporally prior to the one of the plurality of resource instances for which the read request was received.

As will be appreciated by one skilled in the art, the present techniques may be embodied as an apparatus, a system, a method or a computer program. Accordingly, present techniques may take the form of an entirely hardware embodiment, an entirely software embodiment, or an embodiment combining software and hardware aspects.

Embodiments will now be described with reference to the accompanying figures of which:

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. It should also be noted that directions and/or references, for example, such as up, down, top, bottom, and so on, may be used to facilitate discussion of drawings and are not intended to restrict application of claimed subject matter.

Figure 1:
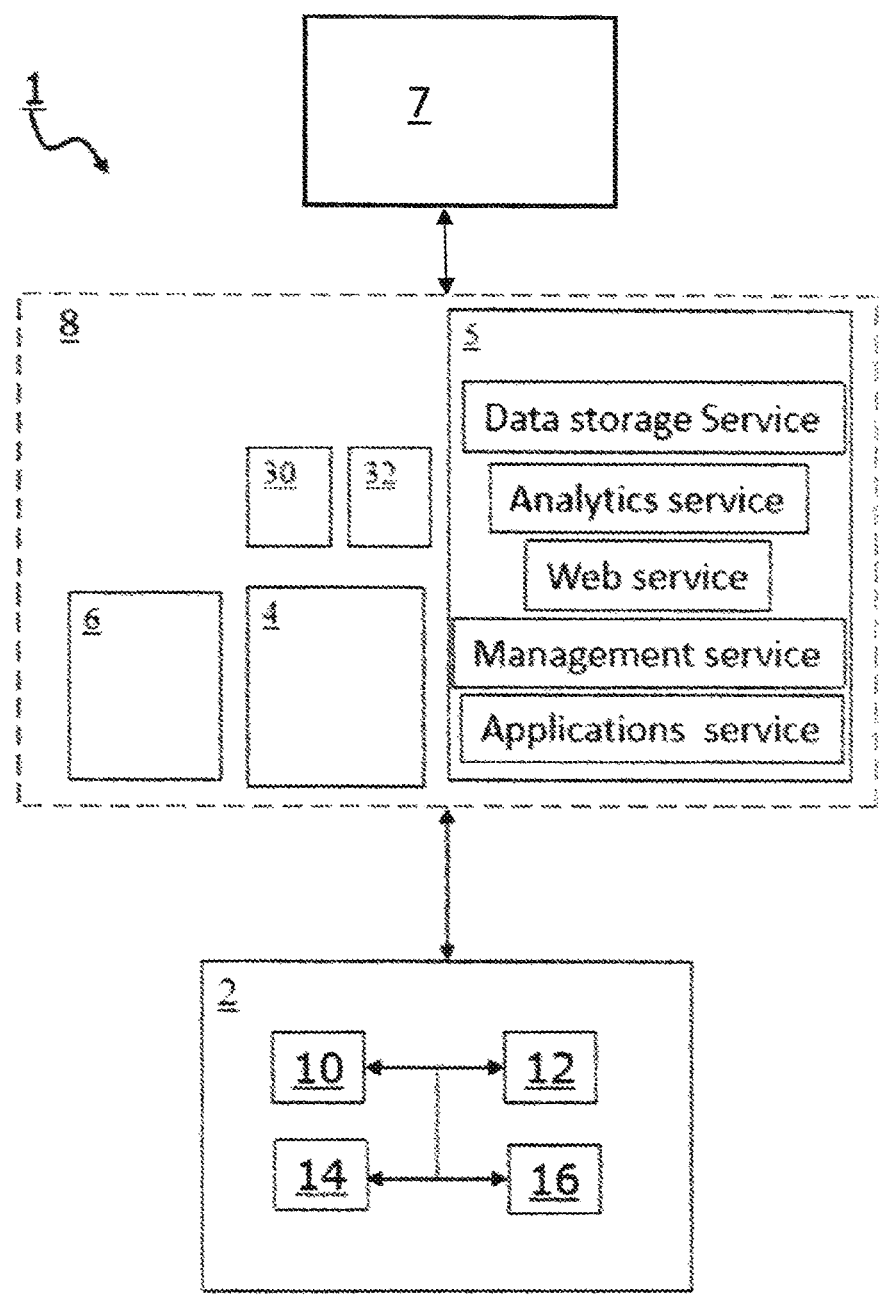
FIG. 1 illustrates an example deployment scenario for a device according to the present techniques.

FIG. 1 shows a deployment scenario 1 for a device 2 according to the present techniques. Device 2 may be a computer terminal, a laptop, a tablet or mobile-phone, or may, for example, be a lightweight M2M (LwM2M) device running a LwM2M client. Device 2 can be used to provide smart functionality for streetlights, electric meters, temperature sensors, building automation, healthcare, and a range of other market segments as part of the IoT. It will be appreciated that the examples of market segments listed above are for illustrative purposes only and the claims are not limited in this respect.

Device 2 is operable to communicate with one or more servers and/or services. As described herein a server (depicted in FIG. 1 as "server 4", "server 6") may be a single computing device or software running on a computing device. However, the claims are not limited in this respect and the server may comprise a plurality of interconnected computing devices (or software running on a plurality of interconnected computing devices), whereby the plurality of interconnected computing devices may be distributed over one or more public and/or private networks. In the present figures, server 4 may, for example, be a LwM2M server, an application server, an edge server, a computer terminal, a laptop, a tablet or mobile-phone, or an application hosted on a computing device, and which provides deployment of one or more services (depicted in FIG. 1 as "service 5"). Such services may include one or more of: web service(s); data storage service; analytics service(s), management service(s) and application service(s), although this list is not exhaustive.

In the present figures, server 6 comprises a bootstrap server which is used to provision resources at the device 2. In embodiments, bootstrap server 6 may be any type of server or remote machine and may not necessarily be a dedicated bootstrap server. Generally speaking the bootstrap server 6 is any means suitable to perform a bootstrap process with the device 2 (e.g. machine, hardware, technology, server, software, etc.). In the present examples, the server 4, bootstrap server 6 and/or services 5 are depicted as being part of a device management platform 8, such as the Pelion™ device management platform from Arm®, Cambridge, UK. The device 2 comprises communication circuitry 10 for communicating with the one or more servers 4 and/or services 5. The communication circuitry 10 may use wireless communication such as, for example, one or more of: Wi-Fi®; short range communication such as radio frequency communication (RFID); near field communication (NFC); communications used in wireless technologies such as Bluetooth®, Bluetooth Low Energy (BLE); cellular communications such as 3G or 4G; and the communication circuitry 10 may also use wired communication such as a fibre optic or metal cable. The communication circuitry 10 could also use two or more different forms of communication, such as several of the examples given above in combination. It will be appreciated that the device 2 could also use any suitable protocols for communications including one or more of: IPv6, IPv6 over Low Power Wireless Standard (6LoWPAN®), Constrained Application Protocol (CoAP), Message Queuing Telemetry Transport (MQTT), Representational state transfer (REST), HTTP, WebSocket, ZigBee®, Thread® although it will be appreciated that these are examples of suitable protocols.

As an illustrative example, CoAP defines the message header, request/response codes, message options and retransmission mechanisms, such as, for example, RESTful Application Programming Interfaces (APIs) on resource constrained devices and supports the methods of GET, POST, PUT, DELETE, which can be mapped to methods of the HTTP protocol. M2M communications are typically required to be secure to reduce the risk that malicious third parties gain access to the data, or to limit the access to data, by devices, servers or services. The device may use one or more security protocols to establish a communications path or channel for providing secure communications between entities. Exemplary security protocols may, for example, comprise Transport Layer Security (TLS) and Datagram Transport Layer Security (DTLS), whereby TLS/DTLS may be used to establish a secure channel between the device 2 and server 4 whereby TLS/DTLS include establishing communications using, certificates (e.g. X.509 certificates) and both pre-shared key and public key technology. The data (e.g. credential data) protected by TLS/DTLS may be encoded as plain text, binary TLV, JSON, CBOR, or any other suitable data exchange format. The device 2 further comprises processing circuitry 12 for controlling various processing operations performed by the device 2. The device 2 may further comprise input/output (I/O) circuitry 14, such that the device 2 can receive inputs (e.g. user inputs, sensor inputs, measurement inputs etc.) and or generate outputs (e.g. audio/visual/control commands etc.). The device 2 further comprises storage circuitry 16 for storing resources, such as credential data, whereby the storage circuitry 16 may comprise volatile and/or non-volatile memory.

Figure 2A:
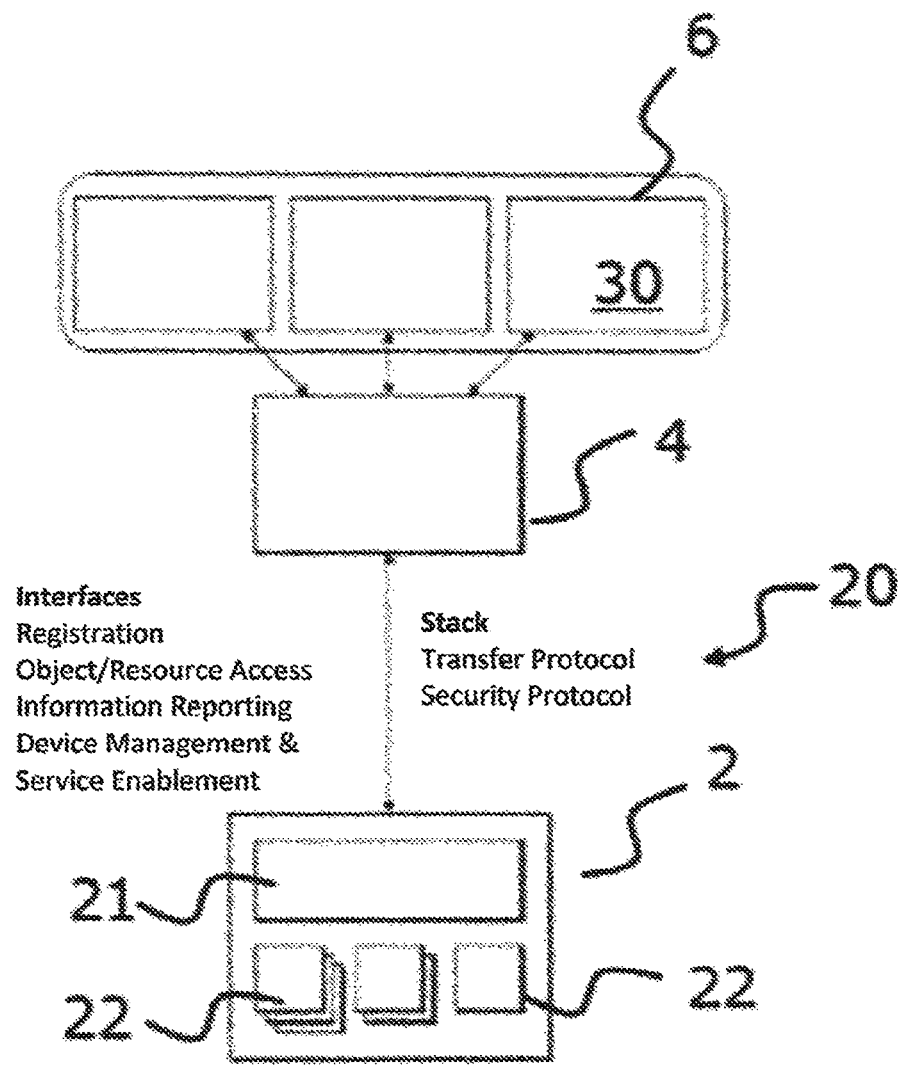
FIG. 2a illustrates an example architecture depicting a client-server relationship between the device of FIG. 1 and a server.
Figure 2B:
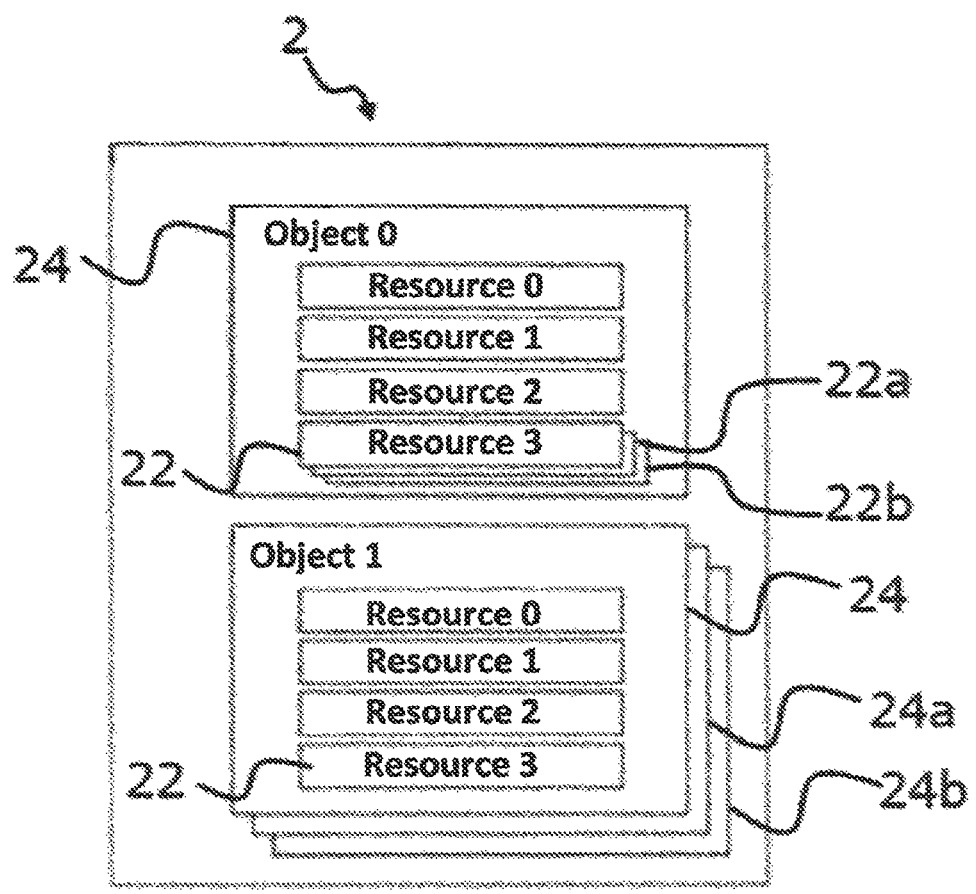
FIG. 2b illustrates a schematic diagram of an object model on the device of FIG. 1.

Such credential data may include one or more of: certificates, cryptographic keys (e.g. shared symmetric keys, public keys, private keys), identifiers (e.g. direct or indirect identifiers) whereby such credential data may be used by the device to authenticate (e.g. connect, establish secure communications, register, enrol etc.) with one or more remote entities (e.g. a bootstrap server/server/services). FIG. 2a illustratively shows an example architecture which illustrates a client-server relationship between the device 2 and server 4. FIG. 2b illustratively shows a schematic diagram of an object model of device 2.

Device 2 is hereafter referred to as "client device" but may also be referred to herein as a 'device', 'node device', 'node', 'end-user device' or 'user device'. In the following examples the server 4 is depicted as a LwM2M server, such that the LwM2M server 4 and client device 2 communicate using suitable protocols, such as those in compliance with the Open Mobile Alliance (OMA) LWM2M specification although the claims are not limited in this respect. The client device 2 comprises client 21 which may be integrated as a software library or a built-in function of a module and which is used in communications with the LwM2M server 4. The client 21 may be an LwM2M client. Logical interfaces may be defined between the client 21 and LwM2M server 4, and three logical interfaces are depicted in FIG. 2, namely:

'Client Registration' interface may be used to perform and maintain registration with one or more LwM2M servers and de-register from one or more LwM2M servers.

'Device management and service enablement' interface may be used by one or more servers to access object(s), object instances and resources available at the client device 2.

'Information Reporting' interface may be used to enable one or more servers to observe any changes in a resource on client device 2, and for receiving notifications when new values are available.

This list of logical interfaces is exemplary only and additional, or alternative, logical interfaces between the client 21 and LwM2M server 4 may be provided, for example, in accordance with the OMA LwM2M specification. The device 2 comprises various resources 22, which can be read, written, executed and/or accessed by the LwM2M server 4 or one or more further servers/services. As an illustrative example, a resource may comprise a value (e.g. generated by circuitry on the device). A web application may, via LwM2M server 4, request the value from the client device 2 (e.g. with a REPORT request), whereby the requested value is read and reported back to the web application by the LwM2M server 4. As a further illustrative example, a resource may comprise credential data provisioned at manufacture (e.g. during a factory provisioning process) or during a communication session with a bootstrap server, and subsequently used to register with the LwM2M server 4.

As depicted in FIG. 2b, the resources 22 may be further logically organized into objects 24, whereby each device 2 can have any number of resources, each of which is associated with a respective object 24. A set of objects on client device 2 may include, for example:

- A 'security object' to handle security aspects between the client device 2 and one or more servers;
- A 'server object' to define data and functions related to a server;
- An 'access control object' to define for each of one or more permitted servers the access rights the one or more servers have for each object on the client device 2;
- A 'device object' to detail resources on the client device 2. As an example, the device object may detail device information such as manufacturer, model, power information, free memory and error information;
- A 'connectivity monitoring object' to group together resources on the client device 2 that assist in monitoring the status of a network connection;
- A 'firmware update object' enables management of firmware which is to be updated, whereby the object includes installing firmware, updating firmware, and performing actions after updating firmware;
- A 'location object' to group those resources that provide information about the current location of the client device 2;
- A 'connection statistics object' to group together resources on the client device 2 that hold statistical information about an existing network connection.

In embodiments device 2 may have one or more instances of an object, three of which are depicted as 24, 24*a* and 24*b* in FIG. 2*b*. As an illustrative example, a temperature sensor device may comprise two or more temperature sensors, and the client device 2 may comprise a different device object instance for each temperature sensor.

Figure 2C:
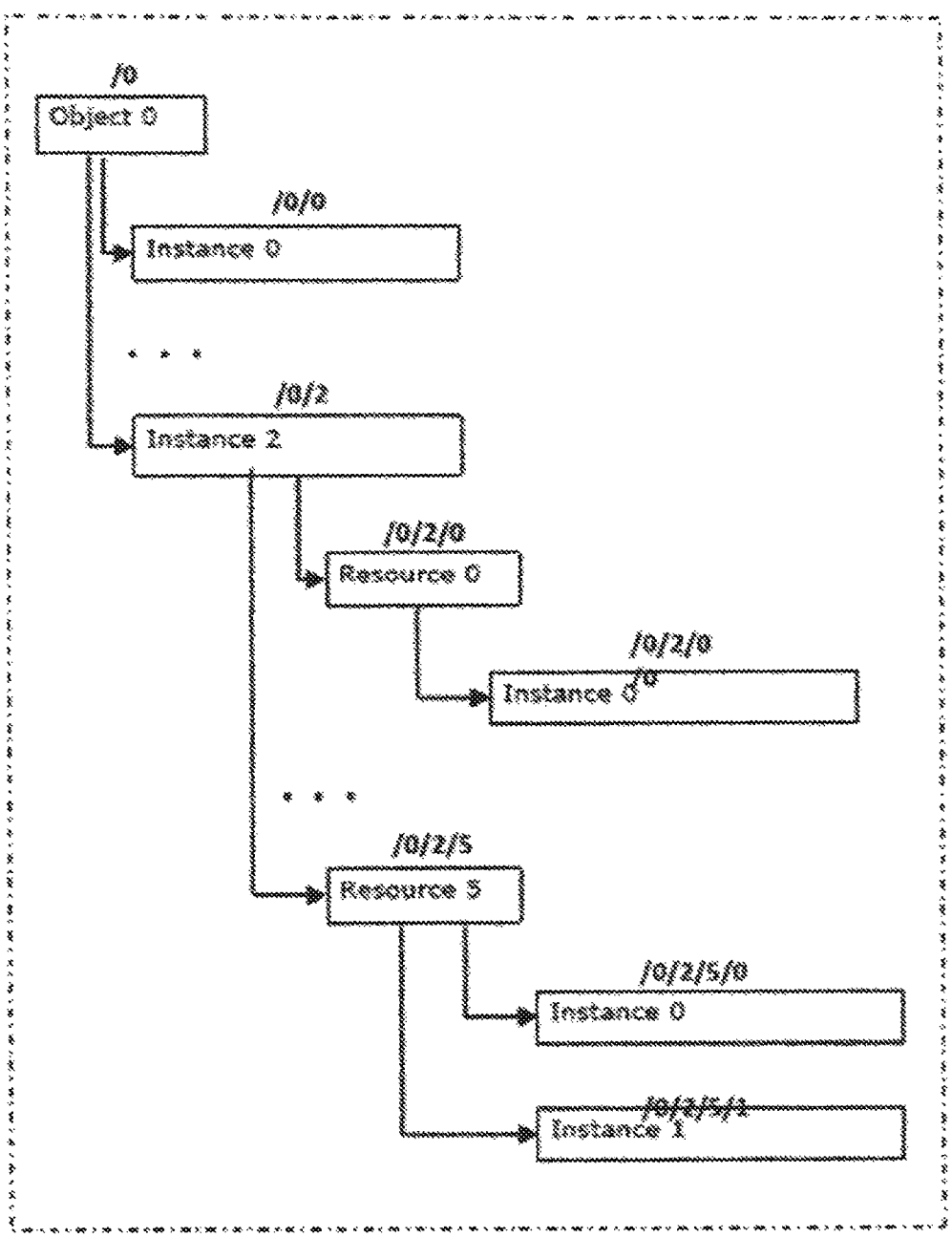
FIG. 2c illustrates one simplified example of a portion of an object hierarchy.

In embodiments a resource may also comprise one or more resource instances which are depicted as 22, 22*a*, 22*b* in FIG. 2*b*. In embodiments the objects, object instances, resources and resource instances are organised in an object hierarchy where each of the objects, object instances, resources and/or resource instances are elements of the object hierarchy, and whereby the device can enumerate the different elements of an object instance hierarchy using one or more characters (e.g. a text string; alphanumeric text, binary etc.). FIG. 2*c* shows one simplified example of a portion of such an object hierarchy 40, with omissions marked by ellipsis marks ( . . . ). In FIG. 2*c*, object 0 instance 2 is shown as having a single instance of resource 0 (that is, resource 0 instance 0), and two instances of resource 5 (that is, resource 5 instance 0 and resource 5 instance 1). The elements of the hierarchy are further marked with a hierarchy notation showing the levels and elements within levels using a slash separator. It will be clear to one of ordinary skill in the art that this is merely one example of a hierarchy notation and is not intended to limit the structure of the hierarchies available using the present techniques. It will also be clear to those of skill in the art that real-world implementations of such hierarchies will be much larger, and that only a very simple example has been shown here. In the hierarchy shown in FIG. 2*c*, an object may represent an LwM2M object. Instances of such objects are created according to the requirements of the system being implemented. Thus, for example, in a system for monitoring heating and cooling in a group of buildings, a Temperature object may be defined having instances for each of the buildings. The Temperature object instances may be defined to comprise resources, such as a Current Temperature resource, a Maximum Temperature resource and a Minimum Temperature resource, and each resource may further comprise instances for various temperature sensors. On registration with a server, a device may then enumerate those elements of an object hierarchy which are to be registered using a suitable identifier, such as a universal resource indicator (URI), in the form:

/{Object ID}/{Object Instance}/{Resource ID} e.g. /3/0/1.

As such, the objects, object instances & resources on a client device may be remotely accessed/managed by, for example, software hosted on a server (e.g. a bootstrap server, LwM2M server 4) or an application running as part of a service 5.

In an embodiment the LwM2M server 4 comprises, or has access to a resource directory (depicted as resource directory 30 in FIG. 1) at the device management platform 8 (as depicted in FIG. 1), whereby the resources of the various client devices registered with the LwM2M server 4 are stored in the resource directory 30.

Thus, the resource directory 30 is a registry of the elements of the object hierarchy on one or more client devices registered with one or more servers. In embodiments the resource directory 30 may be realized using a processor and a storing device such as a hard disc drive and a suitable application, a database application in a computer or it may be realized using cloud computing. In an embodiment client device 2 registers with a LwM2M server 4 by sending a registration request and providing various data (e.g. in a TLS/DTLS handshake), such as providing all of the objects, object instances resources, and/or resource instances thereat (e.g. as a text string or individual identifiers). The LwM2M server 4 stores the identified objects, object instances, resources and/or resource instances in the resource directory 30 for the client device 2. Once the data is in the resource directory 30 the data can then be looked up and resources accessed as required. As the number of objects, object instances, resources and/or resource instances on a client device increases, the size of the registration message will also increase and may impact the system capacity, especially when many client devices attempt to register with the LwM2M server 4 at substantially the same time. To simplify the registration procedure and reduce the size of the registration request from a particular client device, the LwM2M server may use template-based registration, whereby the LwM2M server 4 accesses resource templates which define objects, object instances, resources and/or resource instances for a particular device type. A resource template is a template of at least two pre-determined objects, object instances, resources and/or resource instances. In embodiment a resource template is associated with a device type.

In the present specification, the "device type" is defined by the objects, object instances and resources on a client device, whereby client devices of the same device type will have the same objects, object instances and resources, whilst client devices of a different device type will have different objects, object instances and resources. Moreover, the objects, object instances and resources may have different values on each device. As an illustrative example, a first client device having a first set of resources will be a different client device type to a second client device having a second set of resources, the second set of resources having at least one additional or alternative resource than the first set of resources.

Referring again to FIG. 1, resource templates may be stored in storage 32 on the device management platform 8, hereafter "template storage" 32. In an illustrative example, when a client device 2 registers with the LwM2M server 4 and the objects, object instances, resources and/or resource instances at that client device 2 match the objects, object instances, resources and/or resource instances specified in a resource template in template storage 30, the LwM2M server 4 can store the objects, object instances, resources and/or resource instances identified in the resource template in the resource directory 30 to register that client device 2 at the device management platform 8. In such a scenario the client device 2 can identify the resource template by providing a template identifier in the registration request, where the template identifier may be provisioned on the client device 2 by bootstrap server 6 during a bootstrap process. Such functionality means that the client device 2 is not required to provide all of its objects, object instances, resources and/or resource instances to the LwM2M server 4, rather it just transmits a template identifier to provide for template-based registration. The present techniques provide for the device management platform to determine whether a resource template is available for a client device, and to generate resource templates when appropriate.

Figure 3:
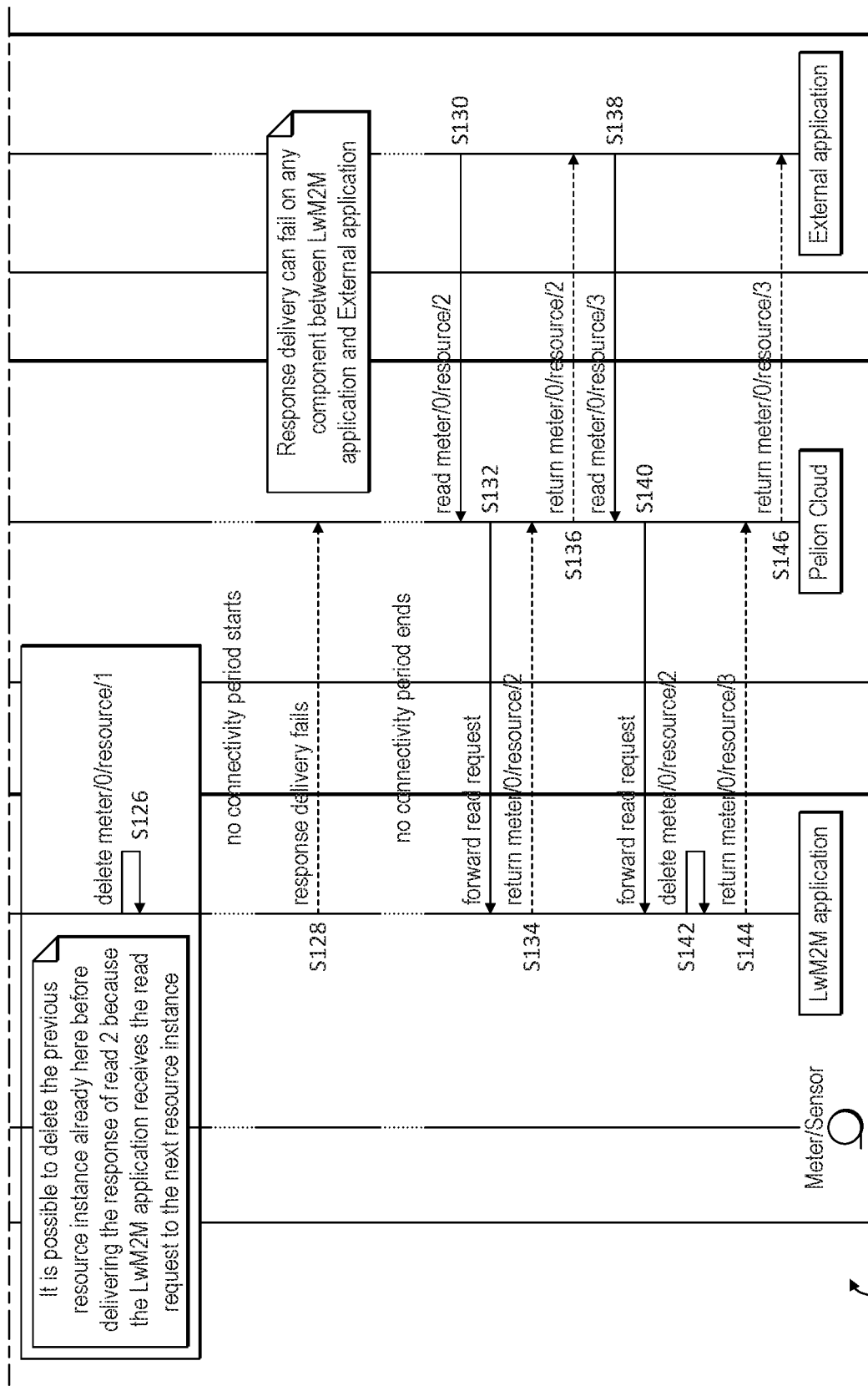
FIG. 3 illustrates a flow diagram of blocks of a method according to various examples.

FIG. 3 shows an illustrative example of an application event delivery process 100 between a client device 2, in the form of an event source device or remote device, a device management platform 8, and an external entity 7 or a third party environment comprising an external application. The method is a computer implemented method and may be a method implemented using the LwM2M protocol. In this respect the method is able to assist in tracking historical data whilst using the LwM2M protocol, notwithstanding the high data abstraction model of the LwM2M protocol.

Figure 4:
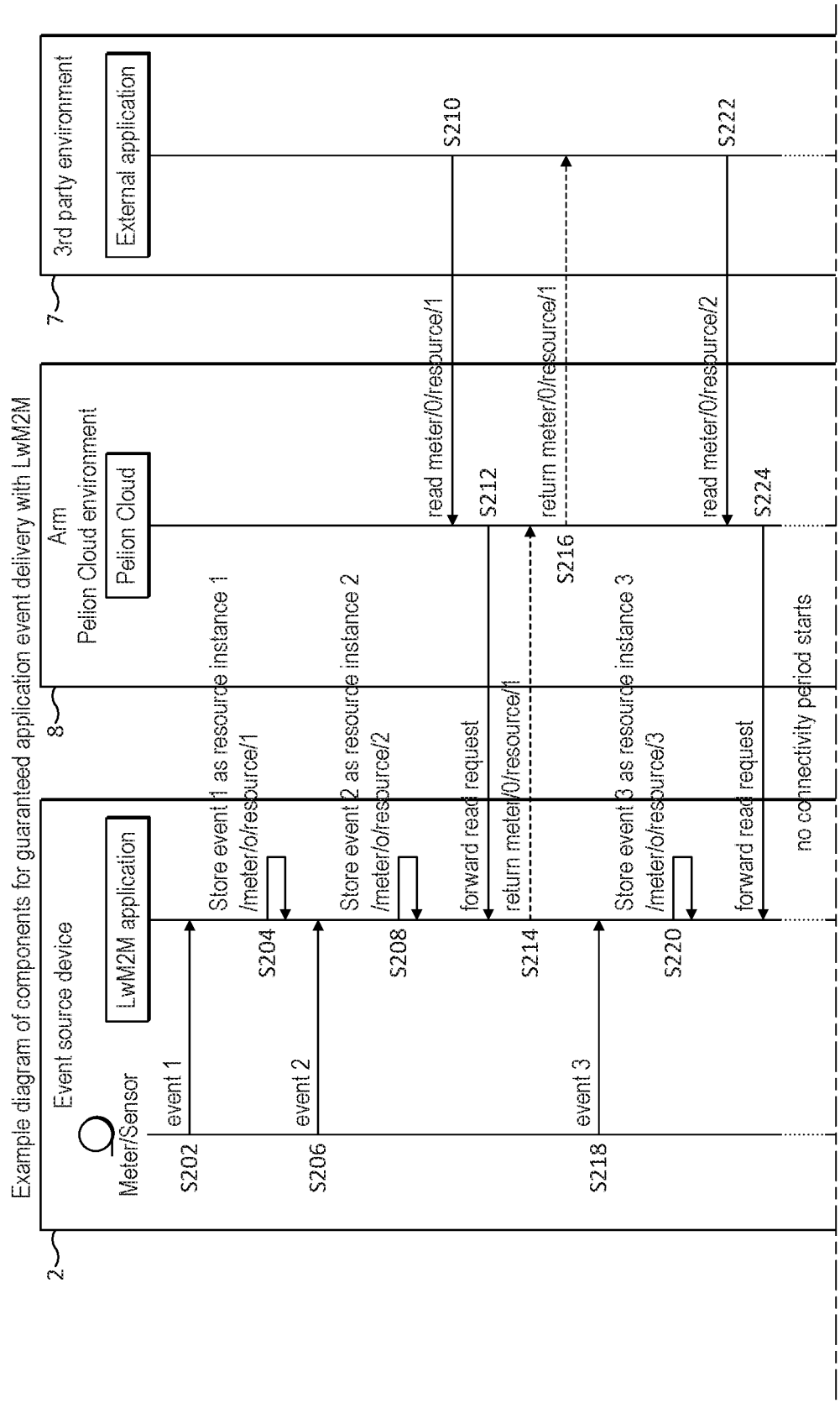
FIG. 4 illustrates a flow diagram of blocks of a method according to various examples.

The process of FIGS. 3 and 4 illustrate determining, or detecting, at a remote device a plurality of occurrences of an event associated with a resource. The resource may be a sensor for measuring a parameter, one example of which may be a temperature sensor. The occurrences of the event may be recorded, or stored, at a memory of, or associated with, the remote device. For each occurrence of the event a different resource instance may be stored at the memory of, or associated with, the remote device. Therefore a plurality of resource instances of the resource may be stored in the memory. Then at least one of the plurality of resource instances may be subsequently transmitted, from the remote device to an external entity, for storage and or processing at the external entity or a further entity connected to the external entity. Thus in such a system, which may be implemented using the LwM2M protocol, historical data for device management can be stored and transmitted as necessary to account for intermittent communication between the remote device and the external entity.

In more detail, in the process of FIG. 3, at S102, the remote device 2 detects a first occurrence of an event associated with a resource. The event may arise from, identify or represent a state transition in a measured value, such as a change in a temperature measurement at an associated temperature sensor. In alternatives, the event may be a temporally periodic event, such as a periodic temperature measurement.

At S104 a first resource instance of the resource is stored at a memory 16 of the remote device 2. The first resource instance may be stored in a first location in the memory 16 of the remote device 2. The first resource instance comprises a first resource instance identifier and first event data associated with the first occurrence of the event. The first resource instance may comprise a timestamp for the first occurrence of the event.

At S106 the remote device 2 detects a second occurrence of an event associated with the resource. At S108 a second different resource instance of the resource is stored at the memory 16 of the remote device 2. The second different resource instance may be stored in a second location in the memory 16 of the remote device 2. The second different resource instance comprises a second resource instance identifier and second event data associated with the second occurrence of the event. The second different resource instance may comprise a timestamp for the second occurrence of the event, the second event occurring subsequent to the first event. In this manner, the events are received and stored in a monotonic order.

At S110 a read request for the first resource instance is transmitted to the remote device 2, from an external entity 7. The external entity 7 may be a third party environment such as a customer application. The read request comprises the first resource instance identifier, such that the resource instance of interest can be identified at the remote device 2 to be returned to the external entity 7. In the embodiment of FIG. 3 the read request is transmitted to the remote device 2 via a device management platform 8, such as the Pelion™ device management platform from Arm®, Cambridge, UK, such that S110 provides transmission of the read request from the external entity 7 to the device management platform 8 for onward transmission to the remote device 2 at S112. The device management platform 8 forwards the received read request from the external entity 7 to the remote device 2.

At S114 the first resource instance identified by the first resource instance identifier is transmitted to the external entity 7 from the remote device 2. In the embodiment of FIG. 3 the first resource instance is transmitted to the external entity 7 via the device management platform 8, such that S114 provides transmission of the first resource instance from the remote device 2 to the device management platform 8 for onward transmission to the external entity 7 at S116. The device management platform 8 forwards the received first resource instance from the remote device 2 to the external entity 7.

Further occurrences of the event may be detected at the remote device 2, such as the third occurrence of the event shown in FIG. 3 at S118, and stored as subsequent resource instances, for example the third different resource instance at S120. The number of resource instances that may be stored may be limited by the capacity of the memory 16 at the remote device 2 or by some predetermined number of resource instances.

At S122 a read request for the second different resource instance is transmitted to the remote device 2, from an external entity 7. The read request comprises the second resource instance identifier, such that the resource instance of interest can be identified at the remote device 2 to be returned to the external entity 7. In the embodiment of FIG. 3 the read request is transmitted to the remote device 2 via a device management platform 8, such that S122 provides transmission of the read request from the external entity 7 to the device management platform 8 for onward transmission to the remote device 2 at S124. The device management platform 8 forwards the received read request from the external entity 7 to the remote device 2.

In FIG. 3, when the remote device 2 receives the read request for the second different resource instance from the external entity 7, it may be confirmed that the external entity 7 has previously received the first resource instance from the remote device 2.

One mechanism for confirming that the external entity 7 has received a resource instance from the remote device 2 is to increment a resource instance identifier value at the external entity 7 following receipt of the resource instance at the external entity 7, the resource instance identifier value indicating a resource instance identifier for a next read request. In this way, if the remote device 2 receives a read request for a specific resource instance from a stored list of temporally ordered resource instances at the remote device 2, then the remote device can be sure that the temporally previous resource instance has been received at the external entity 7.

For example, confirmation that the external entity 7 has received a first resource instance from the remote device 2 can be effected by incrementing a resource instance identifier value at the external entity 7 following receipt of the first resource instance at the external entity 7, the resource instance identifier value indicating a resource instance identifier for a next read request, such that if the external entity was then to request the second different resource instance from the remote device 2 as the next read request, it must have received the first resource instance since the resource instance identifier value has been incremented to identify the second different resource instance.

When the first resource instance has been successfully transmitted to the external entity 7, for example by the above confirmation mechanism, it is then possible to modify the first resource instance without detriment to the continuity of data received at the external entity 7. Modifying the first resource instance may mean archiving the first resource instance, comprising, at least, the first resource instance identifier and the first event data associated with the first occurrence of the event, either at the remote device 2 or at another entity, for example at the device management platform 8. Alternatively, or in addition, modifying the first resource instance may mean deleting the first resource instance, comprising, at least, the first resource instance identifier and the first event data associated with the first occurrence of the event, from the memory 16 at the remote device 2. Deleting from memory 16 may mean a physical erasure of the respective data stored in memory 16, for example the first resource instance stored in memory 16, or flagging that the memory address relating to the respective data is free to be overwritten by another resource instance.

Whilst the second different resource instance may then be transmitted from the remote device 2 in response to the read request for the second different resource instance transmitted to the remote device 2, from the external entity 7, on occasion the delivery of the second different resource instance to the device management platform 8 or external entity 7 may fail at S128, due to, for example a period of loss of communications between any leg of the communication between the remote device 2 and the external entity 7. Should the external entity 7 not receive the second different resource instance in response to the read request for the second different resource instance transmitted to the remote device 2, then a further read request for the second different resource instance may be transmitted to the remote device 2, from the external entity 7 at S130. Such a repeat read request may be effected a predetermined period of time after transmitting the initial read request for the second different resource instance. Alternatively, such a repeat read request may be effected by the external entity 7, if the external entity 7 itself becomes aware of a period of communication loss that may have affected the transmission of the read request to the remote device 2.

In the embodiment of FIG. 3 the further read request for the second different resource instance is transmitted to the remote device 2 via a device management platform 8, such that S130 provides transmission of the further read request from the external entity 7 to the device management platform 8 for onward transmission to the remote device 2 at S132. The device management platform 8 forwards the received further read request from the external entity 7 to the remote device 2.

At S134 the second different resource instance identified by the second resource instance identifier is transmitted to the external entity 7 from the remote device 2. In the embodiment of FIG. 3 the second different resource instance is transmitted to the external entity 7 via the device management platform 8, such that S134 provides transmission of the second different resource instance from the remote device 2 to the device management platform 8 for onward transmission to the external entity 7 at S136. The device management platform 8 forwards the received second different resource instance from the remote device 2 to the external entity 7.

Data for further occurrences of the event, such as a third occurrence of the event associated with the resource at S118, can be requested in a monotonic order. In the embodiment of FIG. 3 a read request for the third resource instance is transmitted to the remote device 2 via a device management platform 8, such that S138 provides transmission of the read request for the third resource instance from the external entity 7 to the device management platform 8 for onward transmission to the remote device 2 at S140. The device management platform 8 forwards the received read request for the third resource instance from the external entity 7 to the remote device 2.

It will be understood that once a read request for a resource instance has been received at the remote device 2, any previous resource instances may be archived and/or deleted, as previously noted. For example, once a read request for a fourth resource instance has been received at the remote device 2, the third resource, or any of the first, second and third resources can be archived and/or deleted. In the embodiment of FIG. 3 the second different resource instance is deleted at S142 once the read request for the third resource instance has been received at the remote device at S140.

At S144 the third resource instance identified by the third resource instance identifier is transmitted to the external entity 7 from the remote device 2. In the embodiment of FIG. 3 the third resource instance is transmitted to the external entity 7 via the device management platform 8, such that S144 provides transmission of the third resource instance from the remote device 2 to the device management platform 8 for onward transmission to the external entity 7 at S146. The device management platform 8 forwards the received third resource instance from the remote device 2 to the external entity 7. As will be understood any number of events may be detected at the remote device, which may include a predetermined number of events or a number of events determined via continuous or intermittent operation of the remote device.

FIG. 4 shows an illustrative example of an application event delivery process 200 between a client device 2, in the form of an event source device or remote device, a device management platform 8, and an external entity 7 or a third party environment comprising an external application. The method is similar to that shown in FIG. 3, but with an alternative timeframe for the modification of the stored resource instances.

In the process of FIG. 4, at S202, the remote device 2 detects a first occurrence of an event associated with a resource. The event may arise from, identify or represent a state transition in a measured value, such as a change in a temperature measurement at an associated temperature sensor. In alternatives, the event may be a temporally periodic event, such as a periodic temperature measurement.

At S204 a first resource instance of the resource is stored at a memory 16 of the remote device 2. The first resource instance may be stored in a first location in the memory 16 of the remote device 2. The first resource instance comprises a first resource instance identifier and first event data associated with the first occurrence of the event. The first resource instance may comprise a timestamp for the first occurrence of the event.

At S206 the remote device 2 detects a second occurrence of an event associated with the resource. At S208 a second different resource instance of the resource is stored at the memory 16 of the remote device 2. The second different resource instance may be stored in a second location in the memory 16 of the remote device 2. The second different resource instance comprises a second resource instance identifier and second event data associated with the second occurrence of the event. The second different resource instance may comprise a timestamp for the second occurrence of the event, the second event occurring subsequent to the first event. In this manner, the events are received and stored in a monotonic order.

At S210 a read request for the first resource instance is transmitted to the remote device 2, from an external entity 7. The external entity 7 may be a third party environment such as a customer application. The read request comprises the first resource instance identifier, such that the resource instance of interest can be identified at the remote device 2 to be returned to the external entity 7. In the embodiment of FIG. 4 the read request is transmitted to the remote device 2 via a device management platform 8, such as the Pelion™ device management platform from Arm®, Cambridge, UK, such that S110 provides transmission of the read request from the external entity 7 to the device management platform 8 for onward transmission to the remote device 2 at S212. The device management platform 8 forwards the received read request from the external entity 7 to the remote device 2.

At S214 the first resource instance identified by the first resource instance identifier is transmitted to the external entity 7 from the remote device 2. In the embodiment of FIG. 4 the first resource instance is transmitted to the external entity 7 via the device management platform 8, such that S214 provides transmission of the first resource instance from the remote device 2 to the device management platform 8 for onward transmission to the external entity 7 at S216. The device management platform 8 forwards the received first resource instance from the remote device 2 to the external entity 7.

Further occurrences of the event may be detected at the remote device 2, such as the third occurrence of the event shown in FIG. 4 at S218, and stored as subsequent resource instances, for example the third different resource instance at S220. The number of resource instances that may be stored may be limited by the capacity of the memory 16 at the remote device 2 or by some predetermined number of resource instances.

At S222 a read request for the second different resource instance is transmitted to the remote device 2, from an external entity 7. The read request comprises the second resource instance identifier, such that the resource instance of interest can be identified at the remote device 2 to be returned to the external entity 7. In the embodiment of FIG. 4 the read request is transmitted to the remote device 2 via a device management platform 8, such that S222 provides transmission of the read request from the external entity 7 to the device management platform 8 for onward transmission to the remote device 2 at S224. The device management platform 8 forwards the received read request from the external entity 7 to the remote device 2.

Whilst the second different resource instance may then be transmitted from the remote device 2 in response to the read request for the second different resource instance transmitted to the remote device 2, from the external entity 7, on occasion the delivery of the second different resource instance to the device management platform 8 or external entity 7 may fail at S226, due to, for example a period of loss of communications between any leg of the communication between the remote device 2 and the external entity 7. Should the external entity 7 not receive the second different resource instance in response to the read request for the second different resource instance transmitted to the remote device 2, then a further read request for the second different resource instance may be transmitted to the remote device 2, from the external entity 7 at S228. Such a repeat read request may be effected a predetermined period of time after transmitting the initial read request for the second different resource instance. Alternatively, such a repeat read request may be effected by the external entity 7, if the external entity 7 itself becomes aware of a period of communication loss that may have affected the transmission of the read request to the remote device 2.

In the embodiment of FIG. 4 the further read request for the second different resource instance is transmitted to the remote device 2 via a device management platform 8, such that S228 provides transmission of the further read request from the external entity 7 to the device management platform 8 for onward transmission to the remote device 2 at S230. The device management platform 8 forwards the received further read request from the external entity 7 to the remote device 2.

Similar to the method described in relation to the process of FIG. 3, one mechanism for confirming that the external entity 7 has received a resource instance from the remote device 2 is to increment a resource instance identifier value at the external entity 7 following receipt of the resource instance at the external entity 7, the resource instance identifier value indicating a resource instance identifier for a next read request. In this way, if the remote device 2 receives a read request for a specific resource instance from a stored list of temporally ordered resource instances at the remote device 2, then the remote device can be sure that the temporally previous resource instance has been received at the external entity 7.

For example, confirmation that the external entity 7 has received a first resource instance from the remote device 2 can be effected by incrementing a resource instance identifier value at the external entity 7 following receipt of the first resource instance at the external entity 7, the resource instance identifier value indicating a resource instance identifier for a next read request, such that if the external entity was then to request the second different resource instance from the remote device 2 as the next read request, it must have received the first resource instance since the resource instance identifier value has been incremented to identify the second different resource instance.

At S232 the second different resource instance identified by the second resource instance identifier is transmitted from the remote device 2 ultimately for receipt at the external entity 7.

In the embodiment of FIG. 4 the second different resource instance is transmitted to the external entity 7 via the device management platform 8, such that S232 provides transmission of the second different resource instance from the remote device 2 to the device management platform 8 for onward transmission to the external entity 7 at S236.

In FIG. 4, when the remote device 2 transmits the second different resource instance to the external entity 7, it may be considered that the external entity 7 must have previously received the first resource instance from the remote device 2 as the external entity has sent a read request for the subsequent second different resource instance instigating the transmission of the second different resource instance to the external entity 7. Once the transmission of the second different resource instance from the remote device is effected, it is then possible to modify the first resource instance without detriment to the continuity of data received at the external entity 7. Modifying the first resource instance may mean archiving the first resource instance, comprising, at least, the first resource instance identifier and the first event, either at the remote device 2 or at another entity, for example at the device management platform 8. Alternatively, or in addition, modifying the first resource instance may mean deleting the first resource instance, comprising, at least, the first resource instance identifier and the first event, from the memory 16 at the remote device 2. Deleting from memory 16 may mean a physical erasure of the respective data stored in memory 16, for example the first resource instance stored in memory 16, or flagging that the memory address relating to the respective data is free to be overwritten by another resource instance.

At S236, which may occur after or before the modification of the first resource instance, the device management platform 8 forwards the received second different resource instance from the remote device 2 to the external entity 7.

Data for further occurrences of the event, such as a third occurrence of the event associated with the resource at S218, can be requested in a monotonic order. In the embodiment of FIG. 4 a read request for the third resource instance is transmitted to the remote device 2 via a device management platform 8, such that S238 provides transmission of the read request for the third resource instance from the external entity 7 to the device management platform 8 for onward transmission to the remote device 2 at S240. The device management platform 8 forwards the received read request for the third resource instance from the external entity 7 to the remote device 2.

It will be understood that once transmission of a resource instance has been effected from the remote device 2, any previous resource instances may be archived and/or deleted, as previously noted. For example, once a fourth resource instance has been transmitted from the remote device 2, the third resource, or any of the first, second and third resources can be archived and/or deleted. In the embodiment of FIG. 4 the second different resource instance is deleted at S244 once the transmission of the third resource instance has been effected from the remote device 2 at S242.

Of course, in an alternative, the second different resource instance may alternatively be deleted only once the transmission of the third resource instance has been returned to the external entity 7 in S246.

At S242 the third resource instance identified by the third resource instance identifier is transmitted to the external entity 7 from the remote device 2. In the embodiment of FIG. 4 the third resource instance is transmitted to the external entity 7 via the device management platform 8, such that S242 provides transmission of the third resource instance from the remote device 2 to the device management platform 8 for onward transmission to the external entity 7 at S246. The device management platform 8 forwards the received third resource instance from the remote device 2 to the external entity 7. As will be understood any number of events may be detected at the remote device, which may include a predetermined number of events or a number of events determined via continuous or intermittent operation of the remote device.

The memory 16 of the remote device 2 may comprise a ring buffer such that at least a first resource instance and a second different resource instance can be stored sequentially in the ring buffer. The memory 16 may comprise a plurality of resource instances of the resource being stored sequentially in the ring buffer.

When the ring buffer is full, the earliest of the sequentially stored resource instances may be deleted or overwritten. In some embodiments the earliest of the sequentially stored resource instances may be deleted or overwritten even if the resource instance to be deleted or overwritten has not been successfully transmitted to the external entity 7. In this case, the resource instances stored in the memory 16 of the remote device 2 may not be the next sequential value from that which was last successfully transmitted to the external entity 7. In this case the next read request from the external entity 7 will have a resource instance identifier relating to a deleted resource instance. In this example, the remote device 2 can send the next sequentially available resource instance to the external entity 7, this resource instance including, at least, the resource instance identifier such that the external entity can be apprised of the current status of the memory 16 of the remote device 2. The external entity 7 may then increment the resource instance identifier value to a value which is the resource instance identifier immediately sequentially following that received as a result of the last read request, such that the next read request may be for a resource instance which is still stored in the memory 16 of the remote device 2.

In other embodiments the earliest of the sequentially stored resource instances is only deleted or overwritten when the resource instance to be overwritten has been confirmed to have been received at the external entity 7. In this embodiment, if the resource instance to be overwritten has not been confirmed to have been received at the external entity 7, then the earliest of the sequentially stored resource instances is not deleted or overwritten, which may mean that any newly detected events are not stored, but events that have been stored but not yet successfully transmitted will not be deleted. In this embodiment, earlier stored resource instances will be retained in preference over newer resource instances, which may be preferable in some arrangements.

In an alternative method, events may be sequentially stored in memory 16 and when the next read request is received, irrespective of the resource instance identifier in the read request, all of the as yet unread resource instances are transmitted to the external entity 7. By this method, the memory of the remote device 2 may be cleared for deletion or overwriting during times of good communication to account for any times of poor or ineffectual communication.

In a modification to the above embodiments the method may comprise detecting, at a remote device 2, a plurality of events, the events being temporally monotonic. Further, for each of the plurality of events, a resource instance comprising a resource instance identifier and the event is stored at a memory 16 of the remote device 2. In order to maintain the monotonic ordering each resource instance may have a timestamp or other temporally orderable parameter associated therewith. A read request for one of the plurality of resource instances, may then be received, from an external entity 7, the read request comprising the resource instance identifier for the one of the plurality of resource instances. This may not necessarily be a resource instance immediately following the last received resource instance. For example, the external entity 7 may request the latest resource instance.

Following receiving, from the external entity 7, the read request for one of the plurality of resource instances, the one of the plurality of resource instances for which the read request was received may be transmitted, from the remote device 2 to the external entity 7. In some embodiments all of the plurality of resource instances temporally prior to the one of the plurality of resource instances for which the read request was received may also be transmitted to the external entity 7, thus effectively transmitting the stored history of resource instances. This may be useful for when communication may be more intermittent between the remote device 2 and the external entity 7, for example when communication is only available for a short period in each day, rather than being continuously available. The method of incrementing of a resource instance identifier value, as previously described, can still be carried out in order to maintain a record, at the external entity 7, of the last resource instance requested.

The remote device 2 may then modify one or more of the plurality of resource instances which are temporally prior to the one of the plurality of resource instances for which the read request was received, the modifying of the one or more of the plurality of resource instances comprising archiving or deleting of the resource instances, as previously described.

FIG. 1 illustrates a system comprising a client device 2, in the form of an event source device or remote device, which may be configured to carry out the methods illustrated in FIG. 3 or FIG. 4, and/or as previously described. Further, the system may comprise an external entity 7 or a third party environment comprising an external application, the external entity 7, following receipt of the resource instance for which a read request was received, being configured to increment a resource instance identifier value at the external entity 7, the resource instance identifier value indicating a resource instance identifier for a next read request.

Whilst embodiments described herein have illustrated a remote device as being a device for monitoring temperature, the remote device may be any device capable of measuring any physical parameter or any other parameter to effect a state transition.

Embodiments of the present techniques may provide implementations which conform to the Open Mobile Alliance Lightweight Machine to Machine Technical Specification, Version 1.0 and to one or more revision(s) thereof, including, for example, Versions 1.0.2, 1.1 and 1.3. It will be appreciated that the claims are not limited in this respect.

Embodiments of the present techniques also provide a non-transitory data carrier carrying code which, when implemented on a processor, causes the processor to carry out the methods described herein. The techniques further provide processor control code to implement the above-described methods, for example on a general purpose computer system or on a digital signal processor (DSP). The techniques also provide a carrier carrying processor control code to, when running, implement any of the above methods, in particular on a non-transitory data carrier or on a non-transitory computer readable medium such as a disk, microprocessor, CD- or DVD-ROM, programmed memory such as read-only memory (firmware), or on a data carrier such as an optical or electrical signal carrier. The code may be provided on a (non-transitory) carrier such as a disk, a microprocessor, CD- or DVD-ROM, programmed memory such as non-volatile memory (e.g. Flash) or read-only memory (firmware). Code (and/or data) to implement embodiments of the techniques may comprise source, object or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™ or VHDL (Very high speed integrated circuit Hardware Description Language).

As the skilled person will appreciate, such code and/or data may be distributed between a plurality of coupled components in communication with one another. The techniques may comprise a controller which includes a microprocessor, working memory and program memory coupled to one or more of the components of the system. Computer program code for carrying out operations for the above-described techniques may be written in any combination of one or more programming languages, including object oriented programming languages and conventional procedural programming languages. Code components may be embodied as procedures, methods or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the above-described methods, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In an embodiment, the present techniques may be realised in the form of a data carrier having functional data thereon, said functional data comprising functional computer data structures to, when loaded into a computer system or network and operated upon thereby, enable said computer system to perform all the steps of the above-described method. Those skilled in the art will appreciate that while the foregoing has described what is considered to be the best mode and where appropriate other modes of performing present techniques, the present techniques should not be limited to the specific configurations and methods disclosed in this description of the preferred embodiment. Those skilled in the art will recognise that present techniques have a broad range of applications, and that the embodiments may take a wide range of modifications without departing from any inventive concept as defined in the appended claims.

The invention claimed is:

1. A computer implemented method comprising:
   determining, at a remote device, a first occurrence of an event associated with a resource;
   storing, at a memory of the remote device, a first resource instance of the resource comprising a first resource instance identifier and first event data associated with the first occurrence of the event;
   determining, at a remote device, a second occurrence of an event associated with the resource;

storing, at the memory of the remote device, a second different resource instance of the resource comprising a second resource instance identifier and second event data associated with the second occurrence of the event;

receiving, from an external entity, a read request for the second different resource instance, the read request comprising the second resource instance identifier;

transmitting, from the remote device to an external entity, at least one of the first resource instance and the second different resource instance identified by the second resource instance identifier; and following receipt of a first resource instance at the external entity, incrementing a resource instance identifier value at the external entity, the resource instance identifier value indicating a resource instance identifier for a next read request.

2. The method of claim 1, wherein the first resource instance comprises a time stamp for the first occurrence of the event and the second different resource instance comprises a timestamp for the second occurrence of the event, the second occurrence of the event occurring subsequent to the first occurrence of the event.

3. The method of claim 1, comprising:
following receiving, from the external entity, the read request for the second different resource instance, modifying the first resource instance.

4. The method of claim 3, wherein modifying the first resource instance comprises:
archiving, at the remote device, the first resource instance comprising the first resource instance identifier and the first event data.

5. The method of claim 3, wherein modifying the first resource instance comprises:
deleting, from the memory of the remote device, the first resource instance comprising the first resource instance identifier and the first event data.

6. The method of claim 1, comprising:
following transmitting, from the remote device to the external entity, the second different resource instance, modifying the first resource instance.

7. The method of claim 1, wherein the memory of the remote device comprises a ring buffer; the first resource instance, second different resource instance and one or more further resource instances being stored sequentially in the ring buffer.

8. The method of claim 7, wherein, when the ring buffer is full, the earliest of the sequentially stored resource instances is overwritten, optionally, wherein, the earliest of the sequentially stored resource instances is only overwritten when the resource instance to be overwritten has been received at the external entity.

9. A system comprising:
a remote hardware device configured to:
determine a first occurrence of an event associated with a resource;
store, at a memory of the remote hardware device, a first resource instance of the resource comprising a first resource instance identifier and first event data associated with the first occurrence of the event;
determine a second occurrence of an event associated with the resource;
store, at the memory of the remote hardware device, a second different resource instance of the resource comprising a second resource instance identifier and second event data associated with the second occurrence of the event;

receive, from an external entity, a read request for the second different resource instance, the read request comprising the second resource instance identifier identified by the second resource instance identifier; and transmit, to an external entity, at least one of the first resource instance and the second different resource instance;

the external entity being configured, following receipt of the resource instance for which the read request was received, to increment a resource instance identifier value at the external entity, the resource instance identifier value indicating a resource instance identifier for a next read request.

10. The system of claim 9, wherein the remote hardware device is configured to modify the first resource instance following receiving, from the external entity, the read request for the second different resource instance.

11. The system of claim 9, wherein the remote hardware device is configured to modify the first resource instance following transmitting, from the remote device to the external entity, the second different resource instance.

12. The system of claim 9, wherein the memory of the remote hardware device comprises a ring buffer; the first resource instance, second different resource instance and one or more further resource instances being stored sequentially in the ring buffer.

13. A computer implemented method comprising:
detecting, at a remote device, a plurality of occurrences of an event associated with a resource, the events being temporally monotonic;
storing, at a memory of the remote device, for each of the plurality of occurrences of the event, a resource instance of the resource comprising a resource instance identifier and event data associated with the occurrence of the event;
receiving, from an external entity, a read request for one of the plurality of resource instances, the read request comprising the resource instance identifier for the one of the plurality of resource instances;
modifying one or more of the plurality of resource instances which are temporally prior to the one of the plurality of resource instances for which the read request was received;
following receiving, from the external entity, the read request for one of the plurality of resource instances, transmitting, from the remote device to the external entity, the one of the plurality of resource instances for which the read request was received, optionally transmitting, from the remote device to the external entity, all of the plurality of resource instances temporally prior to the one of the plurality of resource instances for which the read request was received; and
following receipt, at the external entity, of the resource instance for which the read request was received, incrementing a resource instance identifier value at the external entity, the resource instance identifier value indicating a resource instance identifier for a next read request.

14. The method of claim 13, wherein modifying the one or more of the plurality of resource instances which are temporally prior to the one of the plurality of resource instances for which the read request was received comprises:
deleting, from the memory of the remote device, or archiving at the memory of the remote device, the one or more of the plurality of resource instances which are temporally prior to the one of the plurality of resource instances for which the read request was received.

\* \* \* \* \*